US012163678B2

(12) United States Patent
Pickle et al.

(10) Patent No.: US 12,163,678 B2
(45) Date of Patent: *Dec. 10, 2024

(54) MODULATING REHEAT FUNCTIONALITY FOR HVAC SYSTEM

(71) Applicant: Johnson Controls Technology Company, Auburn Hills, MI (US)

(72) Inventors: Stephen Blake Pickle, Norman, OK (US); Norman Jack Blanton, Norman, OK (US); Kerry Lyman Shumway, Norman, OK (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,383

(22) Filed: Jun. 26, 2023

(65) Prior Publication Data

US 2023/0332786 A1    Oct. 19, 2023

Related U.S. Application Data

(63) Continuation of application No. 17/344,677, filed on Jun. 10, 2021, now Pat. No. 11,686,489.

(51) Int. Cl.
*F24F 11/30* (2018.01)
*F24F 3/044* (2006.01)
(Continued)

(52) U.S. Cl.
CPC ............. *F24F 11/30* (2018.01); *F24F 3/044* (2013.01); *F24F 3/14* (2013.01); *F24F 7/00* (2013.01);
(Continued)

(58) Field of Classification Search
CPC .... F24F 11/30; F24F 3/044; F24F 3/14; F24F 7/00; F24F 11/63; F24F 11/64;
(Continued)

(56) References Cited

U.S. PATENT DOCUMENTS 9,346,337 B2   5/2016   Takahashi
9,879,881 B2   1/2018   Hawkins et al.
(Continued)

FOREIGN PATENT DOCUMENTS

WO   WO-2007102345 A1 *  9/2007 ............. F25B 13/00

OTHER PUBLICATIONS

Aaon, The Humidity Control Solution, Sep. 21, 2017, pp. 8, Tulsa, OK, https://www.aaon.com/Documents/Technical/AAON_HumidityControlSolution_170921.pdf.
(Continued)

*Primary Examiner* — Alicia M. Choi
(74) *Attorney, Agent, or Firm* — Fletcher Yoder, P.C.

(57) ABSTRACT

A heating, ventilation, and/or air conditioning (HVAC) system includes a first condenser coil of a refrigerant circuit, wherein the first condenser coil is configured to receive a first refrigerant flow from a compressor of the refrigerant circuit, a modulating valve of the refrigerant circuit, and control circuitry communicatively coupled to the modulating valve. The modulating valve is configured to receive a second refrigerant flow from the compressor and configured to direct the second refrigerant flow to a second condenser coil of the refrigerant circuit and to a reheat coil of the refrigerant circuit in a parallel flow arrangement, and the control circuitry is configured to operate the modulating valve to apportion the second refrigerant flow between the second condenser coil and the reheat coil based on a detected operating parameter of an air flow directed across the reheat coil.

20 Claims, 7 Drawing Sheets

(51) Int. Cl.

| | | |
|---|---|---|
| *F24F 3/14* | (2006.01) | |
| *F24F 7/00* | (2021.01) | |
| *F24F 11/63* | (2018.01) | |
| *F24F 11/64* | (2018.01) | |
| *F24F 11/84* | (2018.01) | |
| *G05B 15/02* | (2006.01) | |
| *F24F 110/10* | (2018.01) | |
| *F24F 110/20* | (2018.01) | |
| *F24F 110/30* | (2018.01) | |

(52) U.S. Cl.
CPC ............. *F24F 11/63* (2018.01); *F24F 11/64* (2018.01); *F24F 11/84* (2018.01); *G05B 15/02* (2013.01); *F24F 2110/10* (2018.01); *F24F 2110/20* (2018.01); *F24F 2110/30* (2018.01); *F24F 2203/021* (2013.01)

(58) Field of Classification Search
CPC .... F24F 11/84; F24F 2110/10; F24F 2110/20; F24F 2110/30; F24F 2203/021; F24F 11/0008; F24F 11/0001; F24F 11/46; F24F 11/74; G05B 15/02; G05B 2219/2614; F25B 2600/0261; F25B 2600/111; F25B 2600/112; F25B 2600/2501; F25B 6/02; F25B 41/20; F25B 49/02; F25B 2600/2507
See application file for complete search history.

(56) References Cited

U.S. PATENT DOCUMENTS

| | | | |
|---|---|---|---|
| 9,989,290 B2 | 6/2018 | Tiranno et al. | |
| 9,995,515 B2 | 6/2018 | Liu | |
| 10,066,860 B2 * | 9/2018 | Downie | F24F 3/153 |
| 2006/0048539 A1 | 3/2006 | Takechi et al. | |
| 2006/0225444 A1 * | 10/2006 | Taras | F24F 3/153 |
| | | | 62/196.4 |
| 2009/0277193 A1 | 11/2009 | Springer et al. | |
| 2011/0100035 A1 | 5/2011 | Taras et al. | |
| 2012/0011866 A1 * | 1/2012 | Scarcella | F25B 41/39 |
| | | | 62/79 |
| 2012/0272669 A1 * | 11/2012 | Blanton | F24F 11/63 |
| | | | 62/89 |
| 2014/0318162 A1 * | 10/2014 | Kopko | F25B 49/025 |
| | | | 62/126 |
| 2015/0013356 A1 | 1/2015 | Karkhanis et al. | |
| 2017/0234564 A1 * | 8/2017 | Goel | F24F 3/14 |
| | | | 62/93 |
| 2017/0343232 A1 * | 11/2017 | Price | F24F 5/0046 |
| 2018/0004173 A1 * | 1/2018 | Patel | G05B 13/048 |
| 2020/0309394 A1 * | 10/2020 | Blanton | F16K 11/00 |
| 2020/0326082 A1 | 10/2020 | Osheroff et al. | |
| 2021/0018234 A1 | 1/2021 | Lingrey et al. | |
| 2021/0113407 A1 * | 4/2021 | Kirschman | A61G 10/02 |
| 2021/0190337 A1 * | 6/2021 | Yu | F24F 3/1405 |
| 2022/0146164 A1 | 5/2022 | Long et al. | |
| 2023/0304679 A1 * | 9/2023 | Reynolds | F24F 3/1405 |

OTHER PUBLICATIONS

Hernandez III, A.C. and Fumo, N., A Review of Variable Refrigerant Flow HVAC System Components for Residential Application, Science Direct—International Journal of Refrigeration, 110, 2020, pp. 47-57.

* cited by examiner

US 12,163,678 B2

MODULATING REHEAT FUNCTIONALITY FOR HVAC SYSTEM

CROSS REFERENCE TO RELATED APPLICATIONS

This application is a continuation of U.S. patent application Ser. No. 17/344,677, entitled "MODULATING REHEAT FUNCTIONALITY FOR HVAC SYSTEM," filed Jun. 10, 2021, which is hereby incorporated by reference in its entirety for all purposes.

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place an intake air flow (e.g., a return air flow, an outdoor air flow, a mixed air flow) in a heat exchange relationship with a refrigerant of a vapor compression circuit to condition the intake air flow to produce the supply air flow that is delivered to the environment. Unfortunately, it may be difficult to control the vapor compression circuit to achieve certain properties of the supply air flow. For example, it may be difficult to operate the vapor compression circuit to acutely control cooling and/or dehumidification of the supply air flow.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) system includes a first condenser coil of a refrigerant circuit, wherein the first condenser coil is configured to receive a first refrigerant flow from a compressor of the refrigerant circuit, a modulating valve of the refrigerant circuit, and control circuitry communicatively coupled to the modulating valve. The modulating valve is configured to receive a second refrigerant flow from the compressor and configured to direct the second refrigerant flow to a second condenser coil of the refrigerant circuit and to a reheat coil of the refrigerant circuit in a parallel flow arrangement, and the control circuitry is configured to operate the modulating valve to apportion the second refrigerant flow between the second condenser coil and the reheat coil based on a detected operating parameter of an air flow directed across the reheat coil.

In one embodiment, a tangible, non-transitory, computer-readable medium includes instructions that, when executed by processing circuitry, are configured to cause the processing circuitry to receive a demand to condition a space serviced by a heating, ventilation, and/or air conditioning (HVAC) system, and operate a modulating valve of the HVAC system to direct a first portion of a refrigerant flow from a compressor of the HVAC system to a condenser coil of the HVAC system via the modulating valve and direct a second portion of the refrigerant flow from the compressor to a reheat coil of the HVAC system via the modulating valve in response to receiving the demand and based on a detected operating parameter of a supply air flow discharged from the HVAC system.

In one embodiment, a heating, ventilation, and/or air conditioning (HVAC) system includes a refrigerant circuit comprising a modulating valve. The refrigerant circuit is configured to direct a first refrigerant flow from a compressor to a first condenser coil and direct a second refrigerant flow from the compressor to the modulating valve, and the modulating valve is configured to direct a first portion of the second refrigerant flow to a second condenser coil and direct a second portion of the second refrigerant flow to a reheat coil. The HVAC system also includes control circuitry configured to operate the modulating valve to apportion the first portion and the second portion of the second refrigerant flow based on a detected operating parameter of a supply air flow directed through the HVAC system.

BRIEF DESCRIPTION OF THE DRAWINGS

Various aspects of this disclosure may be better understood upon reading the following detailed description and upon reference to the drawings in which.

DETAILED DESCRIPTION

Figure 1:
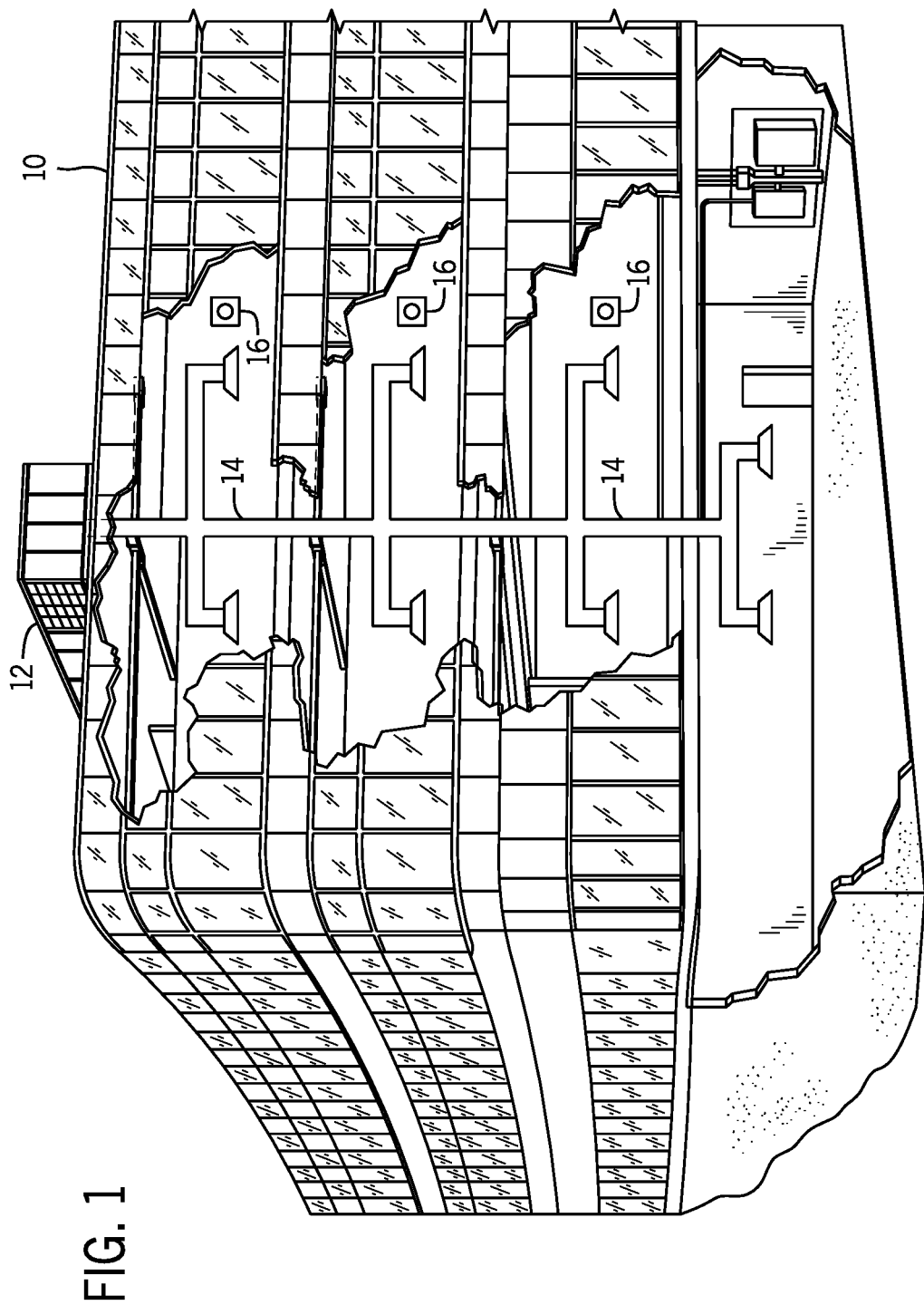
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system. The HVAC system may include a vapor compression system configured to condition a supply air flow for delivery into a space to condition the space. For example, the vapor compression system may include a compressor configured to pressurize a refrigerant, a condenser coil configured cool the refrigerant pressurized by the compressor, and an evaporator coil configured to receive the cooled refrigerant and to place the cooled refrigerant in a heat exchange relationship with an intake air flow (e.g., a return air flow, an outdoor air flow, a mixed air flow) to cool the air flow and produce a supply air flow. The supply air flow may then be directed into the space to cool the space. In this manner, the vapor compression system may be operated to control a temperature of the supply air flow.

In some circumstances, it may also be desirable to control a humidity of the supply air flow delivered into the space. However, it may be difficult to operate existing HVAC systems to acutely control both the humidity and the temperature of the supply air flow. For example, the air flow may be cooled to remove an amount of moisture in the air flow to reduce the humidity of the air flow and produce a supply air flow having a desirable or target humidity level (e.g., to dehumidify the space). However, it may be difficult to operate the vapor compression system to produce the supply air flow having the desirable humidity level while also achieving a target temperature of the supply air flow, such as a target temperature that provides comfort cooling of the space and/or provides neutral air to the space (e.g., supply air having a dry bulb temperature of the space). Thus, operation of the HVAC system to produce a supply air flow with desirable properties may be limited.

Thus, it is presently recognized that operating the vapor compression system to acutely control both the temperature and the humidity of the supply air flow may improve conditioning of the space. Accordingly, embodiments of the present disclosure are directed to a vapor compression system that includes a modulating valve (e.g., a modulating reheat valve). The modulating valve may receive a flow of pressurized refrigerant from a compressor. The modulating valve may direct a first portion of the refrigerant to a condenser coil and a second portion of the refrigerant to a reheat coil. The condenser coil may cool the first portion of the refrigerant (e.g., by placing the first portion of the refrigerant in a heat exchange relationship with an ambient air flow), and the reheat coil may place the second portion of the refrigerant in a heat exchange relationship with an air flow to heat the air flow and cool the second portion of the refrigerant. The first portion and the second portion of the refrigerant (e.g., cooled refrigerant) may then be directed to an evaporator coil, which places the cooled refrigerant in a heat exchange relationship with the air flow to cool the air flow. In this manner, the evaporator coil may cool the air flow via the refrigerant, and the reheat coil may heat the air flow via the refrigerant to produce a supply air flow. The modulating valve may be operated to adjust a first amount of the first portion of the refrigerant directed to the condenser coil relative to a second amount of the second portion of the refrigerant directed to the reheat coil. For example, the modulating valve may be operated to enable the reheat coil to heat the air flow to a target temperature after the evaporator coil has cooled and dehumidified the air flow to a desirable humidity to achieve desirable properties of the supply air flow. Thus, the modulating valve may improve acute control of both the temperature and the humidity of the supply air flow via the vapor compression circuit.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
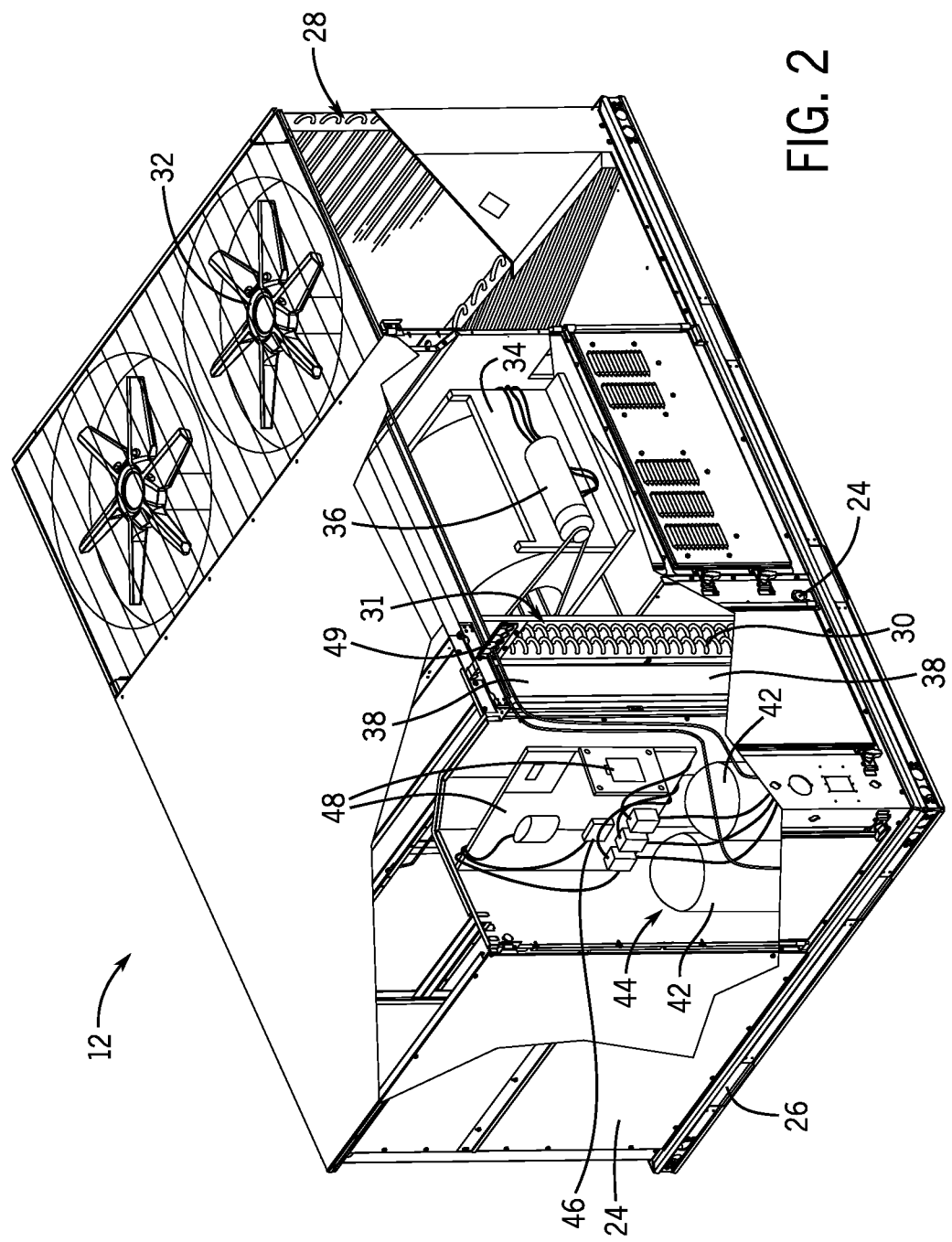
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
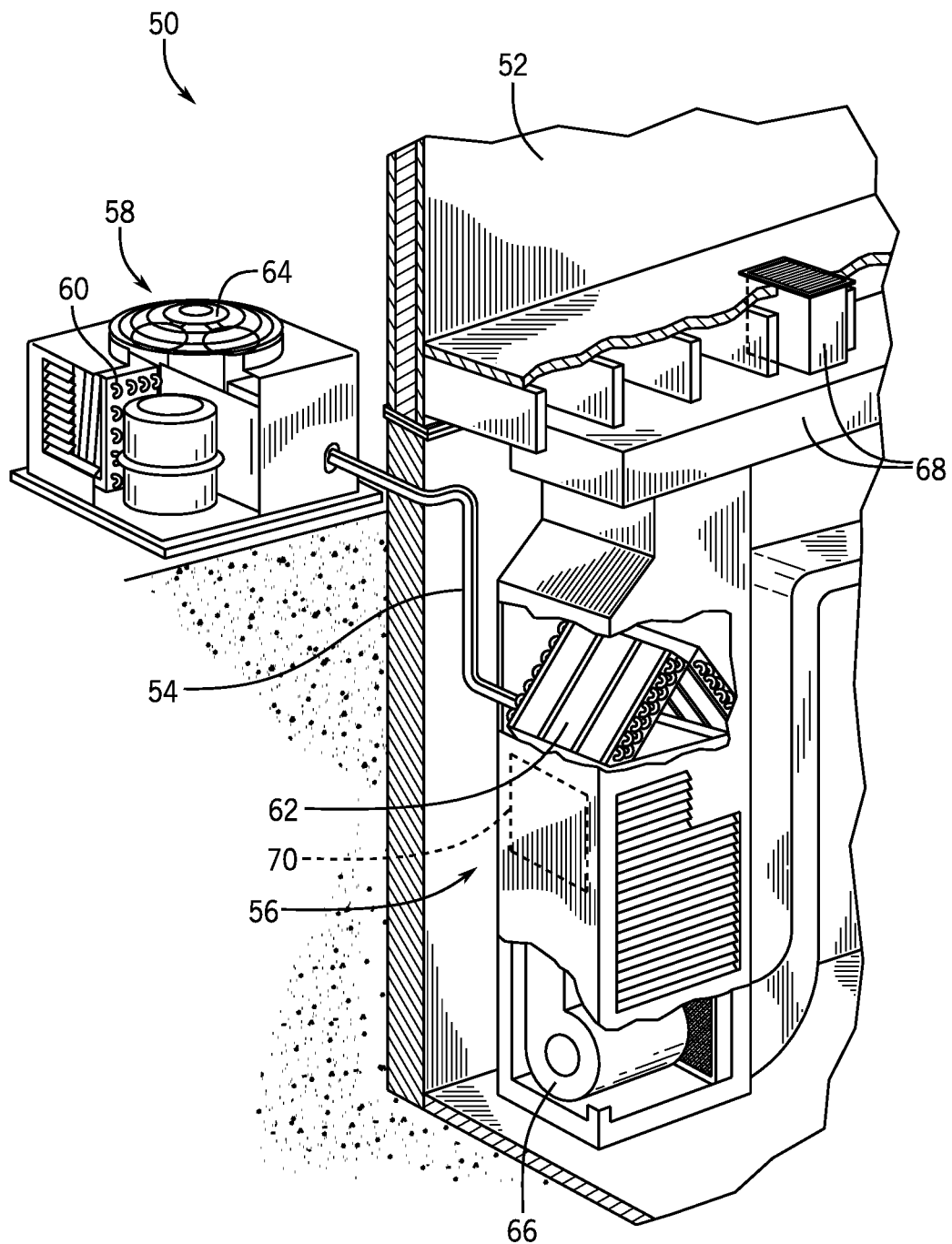
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
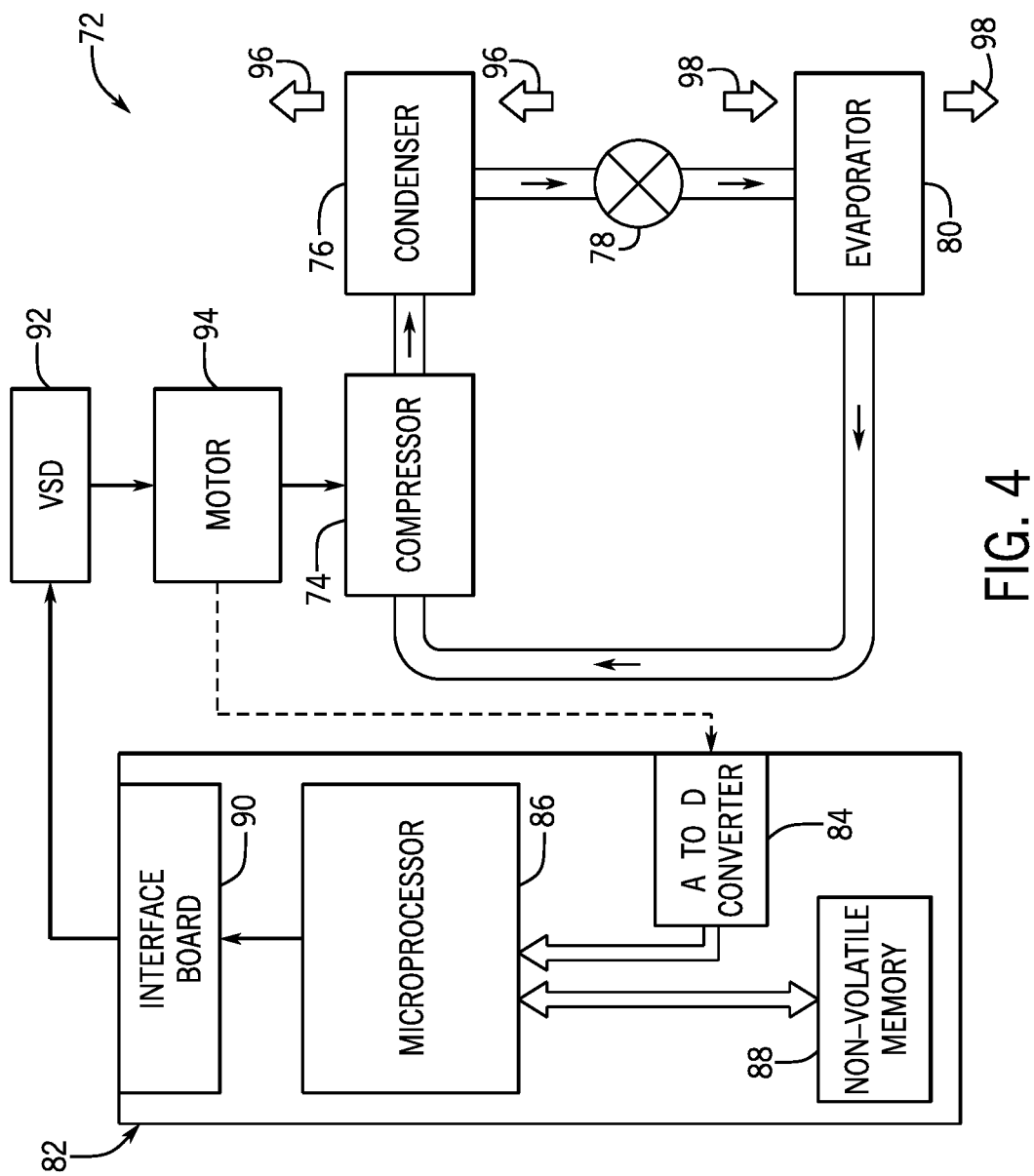
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to a flow direction of the supply air stream 98 and may reheat the supply air stream 98, such as when the supply air stream 98 is overcooled to remove humidity from the supply air stream 98, before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to an HVAC system that includes a vapor compression system having a modulating valve (e.g., a three-way valve). The modulating valve may be configured to receive refrigerant pressurized by a compressor. The modulating valve may direct a first portion of the refrigerant to a condenser and direct a second portion of the refrigerant to a reheat coil. The condenser may cool the first portion of the refrigerant (e.g., via ambient air directed across the condenser), and the reheat coil may place the second portion of the refrigerant in a heat exchange relationship with an intake air flow to heat the intake air flow and cool the second portion of the refrigerant. The cooled first portion and the cooled second portion of the refrigerant may be directed to an evaporator, which places the cooled refrigerant in a heat exchange relationship with the intake air flow to cool the intake air flow. Therefore, the evaporator may cool the intake air flow and the reheat coil may heat the intake air flow to condition the intake air flow and produce a supply air flow, and the supply air flow may be directed to a space serviced by the HVAC system to condition the space. In accordance with present techniques, the modulating valve may be operated to condition the intake air flow more acutely to achieve desirable properties of the supply air flow. For example, the evaporator may cool the intake air flow to remove (e.g., condense) an amount of moisture in the intake air flow to dehumidify the intake air flow to a desirable humidity, and the modulating valve may be controlled to apportion the first portion and the second portion of the refrigerant directed to the condenser and to the reheat coil, respectively, to heat (e.g., reheat) the intake air flow to a target temperature. Accordingly, the modulating valve may improve conditioning of the intake air flow and of the space serviced by the HVAC system.

Figure 5:
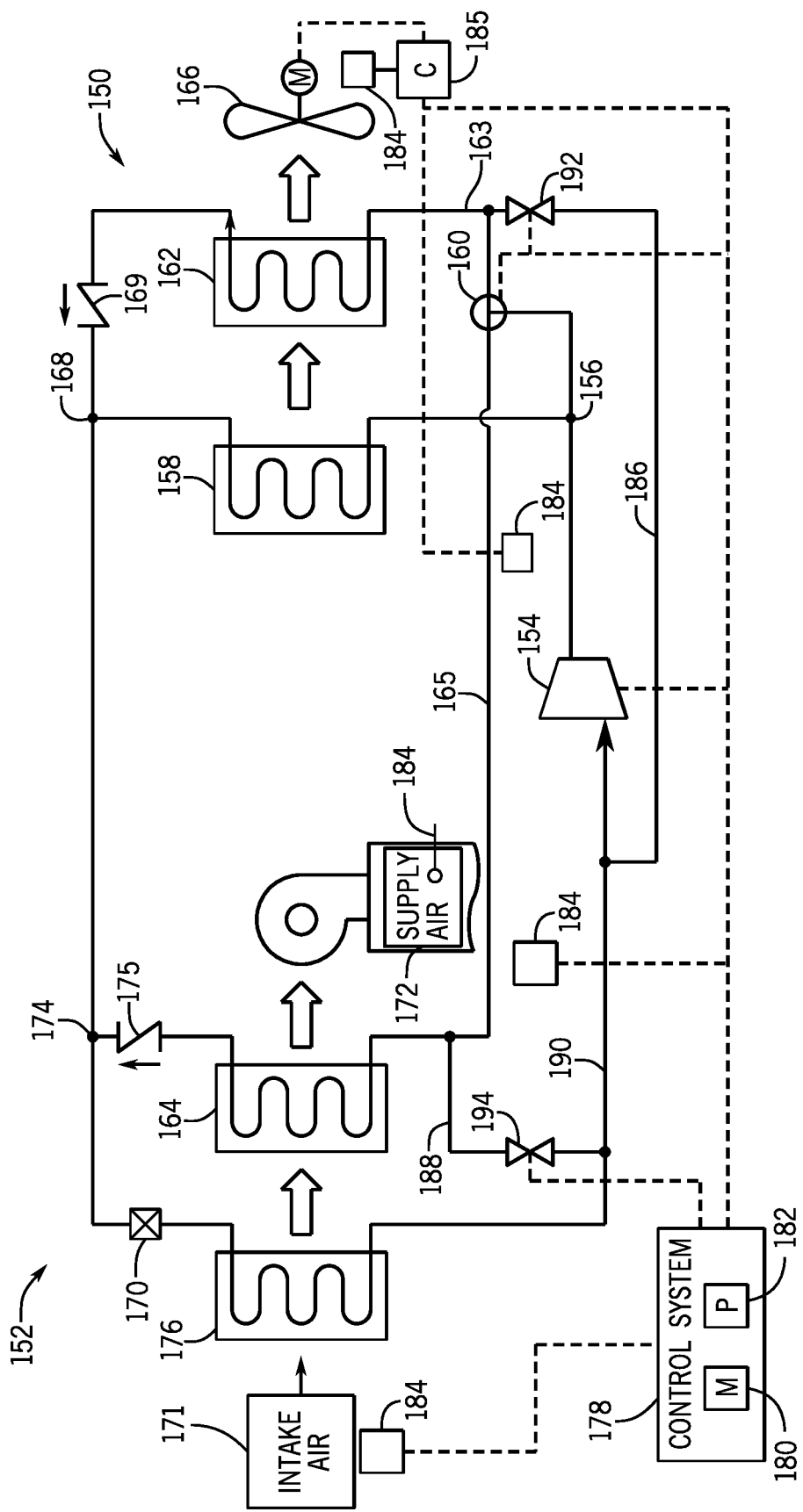
FIG. 5 is a schematic diagram of an embodiment of a vapor compression system configured to apportion refrigerant flow between a condenser coil and a reheat coil, in accordance with an aspect of the present disclosure.

With this in mind, FIG. 5 is a schematic diagram of an embodiment of an HVAC system 150 having a vapor compression circuit 152 through which a refrigerant may be directed. The vapor compression circuit 152 may include a compressor 154 that is configured to pressurize the refrigerant and to direct the pressurized refrigerant to a first junction point or connection point 156. The first junction point 156 may separate the pressurized refrigerant into a first refrigerant flow and a second refrigerant flow. The first junction point 156 (e.g., a T-junction, a valve) may direct the first refrigerant flow to a first condenser coil 158 and direct the second refrigerant flow to a modulating valve 160 (e.g., a three-way valve, a modulating three-way valve). The modulating valve 160 may be configured to direct a first portion of the second refrigerant flow to a second condenser coil 162 via a condensing line 163 and a second portion of the second refrigerant flow to a reheat coil or heat exchanger 164 via a reheat line 165 that are arranged in parallel with one another along the vapor compression circuit 152. In other words, the modulating valve 160 may apportion the second refrigerant flow between the second condenser coil 162 and the reheat coil 164. As described herein, a modulating valve is configured to transition between a first position (e.g., a position that may direct all of the second refrigerant flow to the second condenser coil 162) and a second position (e.g., a position that may direct all of the second refrigerant flow to the reheat coil 164, as well as any of a plurality of positions (e.g., intermediate positions) between the first position and the second position to direct the second refrigerant flow to both the second condenser coil 162 and the reheat coil 164 in a parallel flow arrangement.

As the modulating valve 160 is adjusted across the plurality of positions (e.g., between the first position and the second position) such that respective amounts or portions of the second refrigerant flow to the second condenser coil 162 and the reheat coil 164 may be adjusted or modified.

In certain embodiments, the first condenser coil 158 and the second condenser coil 162 may be of separate condensers. Alternatively, the first condenser coil 158 and the second condenser coil 162 may be of the same condenser (e.g., different sections of the same condenser). Further, in some embodiments, the first junction point 156 may include a valve, and a position of the valve may be controlled to adjust a first amount of the first refrigerant flow relative to a second amount of the second refrigerant flow directed through the vapor compression circuit 152 via the valve. In additional or alternative embodiments, the first junction point 156 may be a fixed junction configured to direct both the first refrigerant flow and the second refrigerant flow in an invariable manner.

The first condenser coil 158 may be configured to cool (e.g., condense) the first refrigerant flow, and the second condenser coil 162 may be configured to cool (e.g., condense) the first portion of the second refrigerant flow. For example, the HVAC system 150 may include a condenser fan 166 configured to direct (e.g., force, draw) an air flow, such as an ambient air flow, across first condenser coil 158 and/or the second condenser coil 162 to cool the first refrigerant flow and/or the first portion of the second refrigerant flow via convection. At a second junction point or connection point 168, the first refrigerant flow discharged by the first condenser coil 158 and the first portion of the second refrigerant flow discharged by the second condenser coil 162 may combine into a first combined refrigerant flow. The first combined refrigerant flow may then be directed along the vapor compression circuit 152 toward an expansion valve 170 of the HVAC system 150. A first check valve 169 may be disposed along the condensing line 163 to block refrigerant flow (e.g., from the first condenser coil 158, from the reheat coil 164) into the condensing line 163 via the second junction point 168. Thus, the first check valve 169 may force flow of the first refrigerant flow and the first portion of the second refrigerant flow toward the expansion valve 170.

The reheat coil 164 may be configured to place the second portion of the second refrigerant flow in a heat exchange relationship with an intake air flow 171, such as air flow entering the HVAC system 150 from the space and/or from an ambient environment (e.g., at an intake section of the HVAC system 150), that is directed across the reheat coil 164. For example, heat may be transferred from the second portion of the second refrigerant flow to the intake air flow 171 to heat the intake air flow 171 and to cool the second portion of the second refrigerant flow. At a third junction point or connection point 174, the second portion of the second refrigerant flow discharged from the reheat coil 164 and the first combined refrigerant flow from the second junction point 168 may combine into a second combined refrigerant flow. A second check valve 175 may be disposed along the reheat line 165 to block refrigerant flow (e.g., from the first condenser coil 158, from the second condenser coil 162) into the reheat line 165 via the third junction point 174. As such, the second check valve 175 may force flow of the second combined refrigerant flow toward the expansion valve 170.

The expansion valve 170 may receive and reduce a pressure of the second combined refrigerant flow, thereby further cooling the second combined refrigerant flow. The expansion valve 170 may then direct the cooled second combined refrigerant flow to an evaporator coil 176 of the vapor compression circuit 152. The evaporator coil 176 may place the intake air flow 171 in a heat exchange relationship with the cooled second combined refrigerant flow, whereby heat is transferred from the intake air flow 171 to the cooled second combined refrigerant flow to cool the intake air flow 171. Thus, the evaporator coil 176 may cool the intake air flow 171, and the reheat coil 164 may heat the intake air flow 171 to produce a supply air flow 172 (e.g., at a discharge section of the HVAC system 150). The supply air flow 172 may then be discharged from the HVAC system into a space serviced by the HVAC system 150 to condition the space. The evaporator coil 176 may discharge the second combined refrigerant flow to the compressor 154 for further circulation through the vapor compression circuit 152.

The modulating valve 160 may be controlled to adjust a first amount of the first portion of the second refrigerant flow directed to the second condenser coil 162 relative to a second amount of the second portion of the second refrigerant flow directed to the reheat coil 164. By way of example, the evaporator coil 176 may cool the intake air flow 171 to remove (e.g., condense) a target or desirable amount of moisture contained within the intake air flow 171, such as to reduce a humidity of the intake air flow 171 to a desirable or target humidity. However, the evaporator coil 176 may cool the intake air flow 171 to a temperature below a target or desirable temperature. Thus, the modulating valve 160 may be operated to enable the reheat coil 164 to increase the temperature of the intake air flow 171 to the target or desirable temperature, thereby enabling acute control of the humidity and/or the temperature of the supply air flow 172. In other words, a position of the modulating valve 160 may be adjusted to modify the first amount of the first portion of the second refrigerant flow relative to the second amount of the second portion of the second refrigerant flow to enable improved conditioning of the intake air flow 171, for example, to produce the supply air flow 172 having both the desirable humidity and the desirable temperature. For example, in order to increase the amount of heat transferred to the intake air flow 171 after cooling of the intake air flow 171 via the evaporator coil 176, the position of the modulating valve 160 may be adjusted to increase the second amount of the second portion of the second refrigerant flow directed to the reheat coil 164. As a result, the first amount of the first portion of the second refrigerant flow directed to the second condenser coil 162 may decrease (e.g., by an amount corresponding to the increase in the second amount of the second portion of the second refrigerant flow).

The HVAC system 150 may include a control system 178 (e.g., control circuitry) that may be configured to operate the modulating valve 160. The control system 178 may include a memory 180 and processing circuitry 182. The memory 180 may include a tangible, non-transitory, computer-readable medium that may store instructions that, when executed by the processing circuitry 182, may cause the processing circuitry 182 to perform various functions described herein. To this end, the processing circuitry 182 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. As an example, the control system 178 may adjust a position of the modulating valve 160 to acutely control a humidity and/or a temperature of the supply air flow 172 delivered into the space serviced by the HVAC system 150.

To this end, the control system 178 may be communicatively coupled to one or more sensors 184 configured to determine an operating parameter associated with the HVAC system 150. For example, the sensor(s) 184 may be configured to determine a current temperature and/or humidity of the space conditioned by the HVAC system 150, a temperature and/or pressure of the refrigerant (e.g., refrigerant flow discharged from the compressor 154, entering the compressor 154, flowing through the evaporator coil 176), a temperature of an ambient environment, a temperature of the supply air flow 172 delivered to the space, a temperature of the intake air flow 171 entering the HVAC system 150, another suitable operating parameter, or any combination thereof. The sensor(s) 184 may transmit data indicative of the operating parameter to the control system 178, and the control system 178 may operate the modulating valve 160 based on the data. As an example, the control system 178 may receive an indication (e.g., a user input) of a request to dehumidify the space conditioned by the HVAC system 150 without changing a temperature of the space. In response, the control system 178 may determine a temperature of the space, of the intake air flow 171, of a return air flow, and/or of an outdoor air flow via the data received from the sensor(s) 184, and the control system 178 may operate the modulating valve 160 to modify a temperature of the supply air flow 172 discharged from the HVAC system 150 to equal the temperature of the space, of the intake air flow 171, of the return air flow, and/or of the outdoor air flow. As another example, the control system 178 may receive an indication of a setpoint temperature and/or a setpoint humidity (e.g., of the supply air flow 172, of the space), and the control system 178 may operate the modulating valve 160 to condition the intake air flow 171 to produce the supply air flow 172 based on the setpoint temperature and/or the setpoint humidity.

In certain embodiments, the control system 178 may be configured to operate the modulating valve 160 to direct the first portion of the second refrigerant flow and/or the second portion of the second refrigerant flow within a range of flow rate values, such as between a lower threshold and an upper threshold. By way of example, the control system 178 may operate the modulating valve 160 to direct between twenty percent and eighty percent of the flow rate of the second refrigerant flow to the second condenser coil 162. In such embodiments, the control system 178 may operate the modulating valve 160 to block the flow rate of the first portion of the second refrigerant flow from exceeding the upper threshold and from being below the lower threshold. The range values may be based on a specification of the HVAC system 150, an application of the HVAC system 150, parameters of the space conditioned by the HVAC system 150, parameters of ambient environment surrounding the space conditioned by the HVAC system 150, and so forth. In some embodiments, the control system 178 may be configured to adjust the range of flow rate values. For instance, the control system 178 may be configured to adjust the range of flow rate values based on a user input indicative of a request to change the upper threshold and/or the lower threshold of the range of flow rate values.

As described above, the modulating valve 160 may be configured to direct all of the refrigerant received from the compressor 154 to the second condenser coil 162. Thus, the control system 178 may position the modulating valve 160 to block refrigerant flow from the compressor 154 to the reheat coil 164. For instance, the modulating valve 160 may be positioned to direct refrigerant flow to the second condenser coil 162 and block refrigerant flow to the reheat coil 164 in a cooling mode of the HVAC system 150. Additionally or alternatively, the modulating valve 160 may be configured to deliver all of the refrigerant received from the compressor 154 to the reheat coil 164. Thus, the control system 178 may position the modulating valve 160 to block refrigerant flow from the compressor 154 to the second condenser coil 162.

In some embodiments, the control system 178 and/or a separate control system 185 (e.g., a condenser fan controller) may be configured to operate the condenser fan 166 to direct refrigerant in a manner that maintains desirable operation of the HVAC system 150. In embodiments of the HVAC system 150 having the separate control system 185, the separate control system 185 may have a memory and processing circuitry similar to the memory 180 and processing circuitry 182 described above. In certain embodiments, the control system 178 and/or the separate control system 185 may operate the condenser fan 166 to direct refrigerant to the expansion valve 170 at a sufficient flow rate to maintain stable desirable operation of the expansion valve 170. In additional or alternative embodiments, the control system 178 and/or the separate control system 185 may operate the condenser fan 166 to direct refrigerant to the reheat coil 164 at a desirable flow rate for reheating the intake air flow 171.

During operation to direct the refrigerant to the expansion valve 170 at the sufficient flow rate, the control system 178 and/or the separate control system 185 may operate the condenser fan 166 to avoid overcooling of the first refrigerant flow and/or of the first portion of the second refrigerant flow, via the first condenser coil 158 and the second condenser coil 162, respectively, in order to maintain a pressure of the first refrigerant flow discharged by the first condenser coil 158 and/or of the first portion of the second refrigerant flow discharged by the second condenser coil 162 above a threshold pressure level. To this end, the control system 178 and/or the separate control system 185 may operate the condenser fan 166 based on an operating parameter indicative of a flow rate of the refrigerant (e.g., of the second combined refrigerant) directed to the expansion valve 170. The operating parameter may include a temperature, pressure, and/or flow rate of the refrigerant (e.g., of the second combined refrigerant flow received by the expansion valve 170, of the refrigerant discharged from the compressor 154, of the first refrigerant flow discharged from the first condenser coil 158, of the first portion of the second refrigerant flow discharged from the second condenser coil 162, of the second portion of the second refrigerant flow discharged from the reheat coil 164), an operation (e.g., a speed, a stage) of the compressor 154, the first amount (e.g., a flow rate) of the first portion of the second refrigerant flow and/or the second amount (e.g., a flow rate) of the second portion of the second refrigerant flow (e.g., a position of the modulating valve 160), a temperature of air flow directed across the first condenser coil 158 and/or the second condenser coil 162 (e.g., an ambient temperature), another suitable operating parameter, or any combination thereof.

As an example, the control system 178 and/or the separate control system 185 may reduce a rate of air flow directed across the first condenser coil 158 and/or the second condenser coil 162 (e.g., to reduce cooling of the first refrigerant flow and/or of the first portion of the second refrigerant flow) based on the operating parameter indicating that the refrigerant flow rate to the expansion valve 170 is below a first threshold flow rate. In this way, refrigerant pressure within the first condenser coil 158 and/or the second condenser coil 162 may be increased, thereby increasing a flow rate of the refrigerant to the expansion valve 170. The increased flow rate of the refrigerant to the expansion valve 170 may enable stable operation of the expansion valve 170. For example, maintaining the refrigerant flow rate above the first threshold flow rate may avoid cyclical opening and closing of the expansion valve 170 caused by insufficient refrigerant pressure to maintain the position of the expansion valve 170. Thus, the control system 178 and/or the separate control system 185 may operate the condenser fan 166 maintain the position of the expansion valve 170.

For instance, the modulating valve 160 may be adjusted to increase an amount of the second portion of the second refrigerant flow directed to the reheat coil 164 and reduce an amount of the first portion of the second refrigerant flow directed to the second condenser coil 162 (e.g., to increase heating provided by the reheat coil 164). Reducing the amount of the first portion of the second refrigerant flow directed to the second condenser coil 162 may initially reduce the flow rate of the refrigerant discharged by the second condenser coil 162, which may also initially reduce the flow rate of the first combined refrigerant flow at the second junction point 168 and cause reduced flow rate of the second combined refrigerant flow at the third junction point 174. That is, the reduced refrigerant flow rate through the second condenser coil 162 may be greater than the increased refrigerant flow rate through the reheat coil 164 to reduce the flow rate of the second combined refrigerant flow at the third junction point 174. As a result, the flow rate of the refrigerant received by the expansion valve 170 may be reduced. For this reason, the control system 178 and/or the separate control system 185 may operate the condenser fan 166 to reduce the rate of air flow directed across the first condenser coil 158 and/or the second condenser coil 162 to increase the temperature and the pressure of the refrigerant directed through the first condenser coil 158 and/or the second condenser coil 162. As such, the flow rate of refrigerant through the first condenser coil 158 and/or the second condenser coil 162 may be increased, thereby increasing the flow rate of refrigerant at the third junction point 174 and at the expansion valve 170. Thus, the control system 178 and/or the separate control system 185 may also operate the condenser fan 166 based on sensor data or feedback indicative of the second portion of the second refrigerant flow through the reheat coil 164 (e.g., relative to the first portion of the second refrigerant flow through the second condenser coil 162), such as the flow rate of the refrigerant through the reheat coil 164, the position of the modulating valve 160, and the like.

The control system 178 and/or the separate control system 185 may also operate the condenser fan 166 to increase the rate of air flow directed across the first condenser coil 158 and/or the second condenser coil 162. As an example, based on a determination that the refrigerant flow rate is above a second threshold flow rate, the control system 178 and/or the separate control system 185 may increase the speed of the condenser fan 166 to increase the rate of air flow directed across the first condenser coil 158 and/or the second condenser coil 162. Increasing the rate of air flow directed across the first condenser coil 158 and/or the second condenser coil 162 may reduce the refrigerant pressure within the first condenser coil 158 and/or the second condenser coil 162, thereby reducing a flow rate of the refrigerant to the expansion valve 170, and may also increase cooling of the first refrigerant flow and/or of the first portion of the second refrigerant flow. That is, the control system 178 may increase the rate of air flow directed across the first condenser coil 158 and/or the second condenser coil 162 to increase the cooling capacity of the refrigerant to enable greater cooling of the intake air flow 171 via the refrigerant at the evaporator coil 176 (e.g., to increase cooling of the space via the HVAC system 150).

During operation to direct refrigerant flow to the reheat coil 164 at a desirable flow rate, the control system 178 and/or the separate control system 185 may operate the condenser fan 166 to enable the reheat coil 164 to provide desirable heating (e.g., reheat) of the intake air flow 171. For example, the control system 178 and/or the separate control system 185 may operate the condenser fan 166 based on an operating parameter indicative of a flow rate of the refrigerant through the reheat coil 164. The operating parameter may include a temperature, pressure, and/or flow rate of the refrigerant (e.g., of the second portion of the second refrigerant flow through the reheat coil 164, of the refrigerant exiting the compressor 154, of the second refrigerant flow received by the modulating valve 160), an operation (e.g., a speed, a stage) of the compressor 154, a temperature of the supply air flow 172, another suitable operating parameter, or any combination thereof.

For instance, the control system 178 and/or the separate control system 185 may reduce the rate of air flow directed across the first condenser coil 158 and/or the second condenser coil 162 based on the operating parameter indicating that the flow rate of the refrigerant through the reheat coil 164 is below a first target flow rate (e.g., the reheat coil 164 may not be sufficiently heating the intake air flow 171). As such, the temperature and the pressure of the refrigerant within the first condenser coil 158 and/or the second condenser coil 162 may be increased to increase the flow rate of the refrigerant to the expansion valve 170, to the evaporator coil 176, to the compressor 154, and so forth, thereby increasing the flow rate of the refrigerant through the vapor compression circuit 152. As a result, the flow rate of the refrigerant discharged by the compressor 154 and subsequently received by the reheat coil 164 may be increased. Thus, the heating (e.g., reheat) provided by the reheat coil 164 may be increased (e.g., to provide sufficient heating of the intake air flow 171).

Further, the control system 178 and/or the separate control system 185 may increase the rate of air flow directed across the first condenser coil 158 and/or the second condenser coil 162 based on the operating parameter indicating that the flow rate of the refrigerant through the reheat coil 164 is above a second target flow rate (e.g., the reheat coil 164 may be overheating the intake air flow 171). Thus, the temperature and the pressure of the refrigerant within the first condenser coil 158 and/or the second condenser coil 162 may be reduced to reduce the flow rate of the refrigerant to the expansion valve 170, to the evaporator coil 176, to the compressor 154, and so forth, thereby reducing the flow rate of the refrigerant through the vapor compression circuit 152. In this way, the flow rate of the refrigerant discharged by the compressor 154 and received by the reheat coil 164 may be reduced, and the heating (e.g., reheat) provided by the reheat coil 164 may be reduced (e.g., to avoid overheating the intake air flow 171).

In this way, control system 178 and/or the separate control system 185 may control the condenser fan 166 based on multiple different operating parameters determined by the sensor(s) 184 to operate the HVAC system 150 in a desirable manner. For example, in response to a determination that the flow rate of the refrigerant to the expansion valve 170 is below the first threshold flow rate, the control system 178 and/or the separate control system 185 may increase the rate of air flow directed across the first condenser coil 158 and/or the second condenser coil 162 regardless of the flow rate of the refrigerant through the reheat coil 164. However, in response to a determination that the flow rate of the refrigerant to the expansion valve 170 is above the second threshold flow rate, the control system 178 and/or the separate control system 185 may reduce the rate of air flow directed across the first condenser coil 158 and/or the second condenser coil 162 to increase heating provided by the reheat coil 164. Thus, the control system 178 and/or the separate control system 185 may enable the reheat coil 164 to provide desirable heating of the intake air flow 171 while maintaining sufficient flow to the expansion valve 170.

In some embodiments, the condenser fan 166 may be a variable speed fan, and the control system 178 and/or the separate control system 185 may operate the condenser fan 166 at a particular speed based on the operating parameter. Additionally or alternatively, the condenser fan 166 may be one of a plurality of fans (e.g., a fan array), and each fan may be independently controllable by the control system 178 and/or the separate control system 185. The control system 178 and/or the separate control system 185 may enable or suspend operation of a subset of the plurality of fans based on the operating parameter. Further still, although the illustrated HVAC system 150 includes a single condenser fan 166 that is configured to direct air flow across both the first condenser coil 158 and the second condenser coil 162, an additional or an alternative embodiment of the HVAC system 150 may include condenser fans 166 that are configured to direct separate air flows across the first condenser coil 158 and the second condenser coil 162.

The illustrated HVAC system 150 also includes a first drain line 186 and a second drain line 188. The first drain line 186 may be configured to enable refrigerant to flow from the condensing line 163 toward a suction line 190 of the vapor compression circuit 152 to enter the compressor 154. For example, the refrigerant may be directed to flow from the condensing line 163 toward the suction line 190 when the refrigerant is blocked from entering the condensing line 163 (e.g., when the modulating valve 160 is positioned to direct all of the refrigerant received from the compressor 154 to the reheat coil 164), thereby increasing an amount of the refrigerant that is available for pressurization by the compressor 154. As such, the first drain line 186 may include a first valve 192 communicatively coupled to the control system 178. The control system 178 may instruct the first valve 192 to open to enable refrigerant flow from the condensing line 163 to the suction line 190 (e.g., when the modulating valve 160 is positioned to block refrigerant flow from the compressor 154 into the condensing line 163), and the control system 178 may instruct the first valve 192 to close to block refrigerant flow from the condensing line 163 to the suction line 190 (e.g., when the modulating valve 160 is positioned to enable refrigerant flow from the compressor 154 into the condensing line 163).

Additionally, the second drain line 188 may be configured to enable refrigerant flow from the reheat line 165 toward the suction line 190, such as when the refrigerant is blocked from entering the reheat line 165 (e.g., when the modulating valve 160 is positioned to direct all of the refrigerant received from the compressor 154 to the second condenser coil 162). Thus, the second drain line 188 may include a second valve 194 communicatively coupled to the control system 178. The control system 178 may instruct the second valve 194 to open to enable refrigerant flow from the reheat line 165 to the suction line 190 (e.g., when the modulating valve 160 is positioned to block refrigerant flow from the compressor 154 into the reheat line 165), and the control system 178 may instruct the second valve 194 to close to block refrigerant flow from the reheat line to the suction line 190 (e.g., when the modulating valve 160 is positioned to enable refrigerant flow from the compressor 154 into the reheat line 165).

Each of FIGS. 6 and 7 discussed below illustrates a method or process for controlling the HVAC system 150, in accordance with the present techniques. In some embodiments, each of the methods may be performed by a single component or system, such as by the control system 178 (e.g., the processing circuitry 182). In additional or alternative embodiments, multiple components (e.g., the control system 178 and the separate control system 185) may perform one or more of the steps discussed below. It should also be noted that additional steps may be performed with respect to the described methods. Moreover, certain steps of the depicted methods may be removed, modified, and/or performed in a different order. Further still, the steps of any of the respective methods may be performed in parallel with one another, such as at the same time and/or in response to one another.

Figure 6:
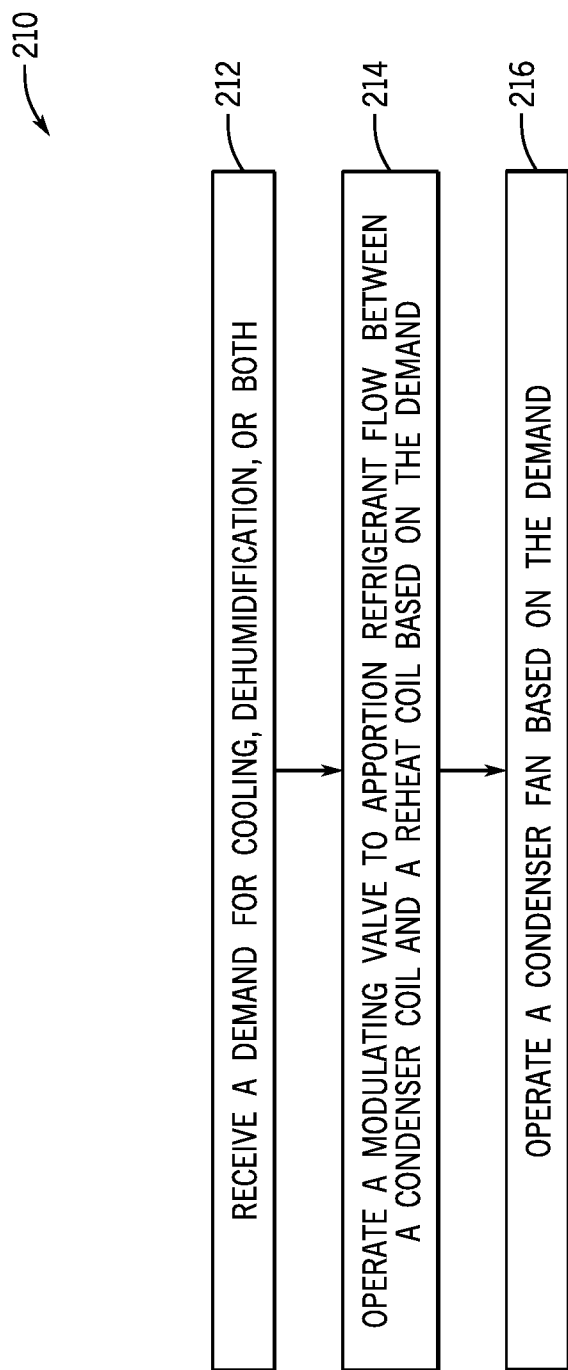
FIG. 6 is a flowchart of an embodiment of a method or process for operating an HVAC system to apportion refrigerant flow between a condenser coil and a reheat coil, in accordance with an aspect of the present disclosure.

FIG. 6 is a flowchart of an embodiment of a method 210 for operating the HVAC system 150 to condition a space serviced by the HVAC system 150. At block 212, a demand for cooling, dehumidification, or both, may be received. In some embodiments, the demand may be received via a user input. As an example, the user input may indicate a setpoint temperature and/or a setpoint humidity of the space. The setpoint temperature and/or the setpoint humidity of the space may then be compared to data transmitted by the sensor(s) 184, such as a current temperature and/or a current humidity of the space, to determine the demand and/or a desired operation of the HVAC system 150 to achieve the setpoint temperature and/or the setpoint humidity of the space. As another example, the user input may indicate a setpoint temperature and/or a setpoint humidity of the supply air flow 172. The setpoint temperature and/or the setpoint humidity of the space may then be compared to a current temperature and/or a current humidity of the supply air flow 172 to determine the demand and/or a desired operation of the HVAC system 150 to achieve the setpoint temperature and/or the setpoint humidity of the supply air flow 172. Indeed, the demand may be associated with a cooling operation of the HVAC system 150 based on the current temperature (e.g., of the space, of the supply air flow 172) being above the setpoint temperature, and the demand may be associated with a dehumidification mode of the HVAC system 150 based on the current humidity of the space, the intake air flow 171, and/or the supply air flow 172 being above the setpoint humidity. As a further example, the user input may directly indicate a request for cooling (e.g., regardless of the current temperature of the space) and/or a request for dehumidification (e.g., regardless of the current humidity of the space). Additionally or alternatively, the demand for cooling, dehumidification, or both, may be received based on other data transmitted by the sensor(s) 184, such as a temperature of the ambient environment, a time stamp, another suitable operating parameter, or any combination thereof.

At block 214, the modulating valve 160 is operated to apportion the second refrigerant flow between the second condenser coil 162 and the reheat coil 164 based on the demand and/or desired operation of the HVAC system 150 determined with respect to block 212. By way of example, a target temperature of the supply air flow 172 may be determined based on the demand. For instance, the target temperature may be based on a setpoint temperature (e.g., a setpoint temperature of the space, a setpoint temperature of the supply air flow 172), a current temperature of the space, a temperature of the ambient environment, a temperature of the intake air flow entering the HVAC system 150, another suitable temperature, or any combination thereof. A current temperature of the supply air flow 172 may then be compared to the target temperature of the supply air flow 172 to provide a comparison result. Based on the comparison result indicating that the current temperature of the supply air flow 172 is below the target temperature of the supply air flow 172, the modulating valve 160 may be adjusted to increase the second amount of the second portion of the second refrigerant flow directed to the reheat coil 164, thereby providing greater heating of the intake air flow 171 via the reheat coil 164 to modify the current temperature of the supply air flow 172 to approach the target temperature of the supply air flow 172. Based on the comparison result indicating that the current temperature of the supply air flow 172 is above the target temperature of the supply air flow 172, the modulating valve 160 may be adjusted to reduce the second amount of the second portion of the second refrigerant flow directed to the reheat coil 164, thereby providing reduced heating of the intake air flow 171 via the reheat coil 164 to modify the current temperature of the supply air flow 172 to approach the target temperature of the supply air flow 172. The modulating valve 160 may additionally or alternatively be adjusted based on other operating parameters, such as a desirable humidity of the supply air flow 172 (e.g., determined based on the demand), a temperature of the air flow directed across the condenser coils 158, 162, an operation of the compressor 154, a property (e.g., a temperature, a pressure) of the refrigerant, another suitable operating parameter, or any combination thereof.

At block 216, the condenser fan 166 may be operated based on the demand. As described above, the condenser fan 166 may be operated to enable refrigerant flow to the expansion valve 170 at a sufficient or desired flow rate. For example, the condenser fan 166 may be operated to reduce a flow rate of the air flow directed across the first condenser coil 158 and/or the second condenser coil 162 to reduce cooling of the refrigerant, thereby increasing the pressure of the refrigerant in the first condenser coil 158 and/or the second condenser coil 162 and thus increasing the flow rate of the refrigerant to the expansion valve 170. In addition, the condenser fan 166 may be operated to increase the flow rate of the air flow directed across the first condenser coil 158 and/or the second condenser coil 162 to increase cooling of the refrigerant, thereby decreasing the temperature and pressure of the refrigerant in the first condenser coil 158 and/or the second condenser coil 162 and thus increasing the flow rate of the refrigerant to the expansion valve 170, as well as the cooling capacity of the refrigerant to cool the intake air flow 171.

Figure 7:
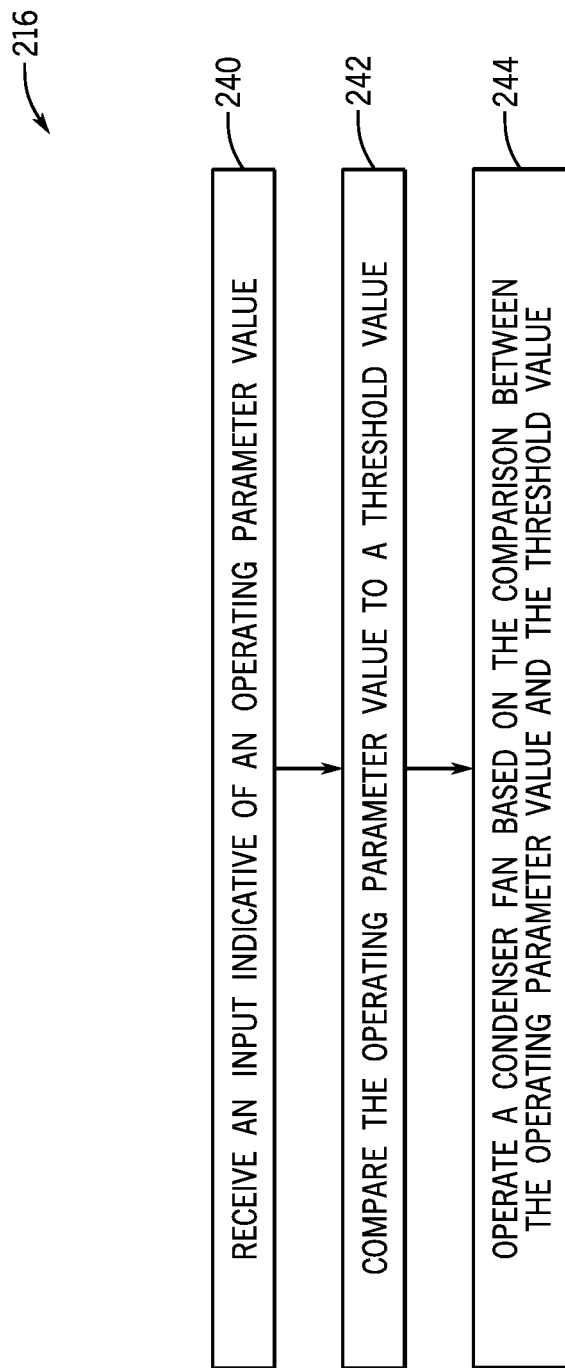
FIG. 7 is a flowchart of an embodiment of a method or process for operating a condenser fan of an HVAC system based on an operating parameter value, in accordance with an aspect of the present disclosure.

FIG. 7 is a flowchart of an embodiment of the block 216 of the method 210, illustrating additional details regarding operation of the condenser fan 166. That is, FIG. 7 illustrates additional details associated with controlling a speed of the condenser fan 166. At block 240, an input indicative of an operating parameter value may be received (e.g., by the control system 178 and/or the separate control system 185). The operating parameter value may be associated with a flow rate of the refrigerant directed to the expansion valve 170 and may include a property (e.g., a temperature, a pressure, a flow rate) of the refrigerant at a particular section of the vapor compression system (e.g., at the reheat coil 164, at the second condenser coil 162), an operation of the compressor 154, a ratio between the first amount of the first portion of the second refrigerant flow directed to the second condenser coil 162 relative to the second amount of the second portion of the second refrigerant flow directed to the reheat coil 164, a temperature of the ambient environment, another suitable operating parameter, or any combination thereof. In some embodiments, the input may include data or feedback received via the sensor(s) 184 configured to monitor the operating parameter value. In additional or alternative embodiments, the input may include a user input (e.g., a temperature setpoint input) indicative of the operating parameter value.

At block 242, the operating parameter value may be compared to a threshold value to provide a comparison result. The comparison result may indicate whether the operating parameter value is greater than the threshold value or is less than the threshold value. Such a comparison result may indicate whether the flow rate of the refrigerant to the expansion valve 170 is at a desirable level (e.g., is above a threshold flow rate) and/or whether the flow rate of the refrigerant through and/or to the reheat coil 164 is at a desirable level (e.g., is above or below a target flow rate).

At block 244, the condenser fan 166 may be operated based on the comparison between the operating parameter value and the threshold value. For example, the condenser fan 166 may be operated to reduce a flow rate of air directed across the first condenser coil 158 and/or the second condenser coil 162 based on the comparison result indicating that the flow rate of refrigerant to the expansion valve 170 is below a desired level (e.g., based on the operating parameter value being below a first threshold value). Reducing the flow rate of air directed across the first condenser coil 158 and/or the second condenser coil 162 may reduce the cooling of the first refrigerant flow and/or of the first portion of the second refrigerant flow, which may result in an increased flow rate of the first refrigerant flow and/or of the first portion of the second refrigerant flow toward the expansion valve 170. Moreover, the condenser fan 166 may be operated to increase a flow rate of air directed across the first condenser coil 158 and/or the second condenser coil 162 based on the comparison result indicating that the flow rate of refrigerant to the expansion valve 170 is at or above a desired level (e.g., based on the operating parameter value being above a second threshold value that is greater than the first threshold value). Increasing the flow rate of air directed across the first condenser coil 158 and/or the second condenser coil 162 may increase the cooling of the first refrigerant flow and/or of the first portion of the second refrigerant flow to increase a cooling capacity of the refrigerant directed through the evaporator coil 176, thereby enabling increased cooling of the intake air flow 171 via the refrigerant while also enabling flow of the refrigerant to the expansion valve 170 at a desired flow rate.

Additionally or alternatively, the condenser fan 166 may be operated to reduce the flow rate of air directed across the first condenser coil 158 and/or the second condenser coil 162 based on the comparison result indicating that the flow rate of refrigerant through the reheat coil 164 is below a desired level (e.g., based on the operating parameter value being below a first target value). Reducing the flow rate of air directed across the first condenser coil 158 and/or the second condenser coil 162 may increase the flow rate of the refrigerant throughout the vapor compression circuit 152 and therefore increase the flow rate of the refrigerant through the reheat coil 164. Moreover, the condenser fan 166 may be operated to increase a flow rate of air directed across the first condenser coil 158 and/or the second condenser coil 162 based on the comparison result indicating that the flow rate of refrigerant through the reheat coil 164 is above a desired level (e.g., based on the operating parameter being above a second target value that is greater than the first target value). Increasing the flow rate of air directed across the first condenser coil 158 and/or the second condenser coil 162 may reduce the flow rate of the refrigerant through the vapor compression circuit 152 and therefore reduce the flow rate of the refrigerant through the reheat coil 164. Thus, the condenser fan 166 may be operated to increase or reduce the flow rate of the refrigerant through the reheat coil 164.

The present disclosure may provide one or more technical effects useful in the operation of an HVAC system. The HVAC system may include a compressor configured to pressurize a refrigerant and to direct a first flow of the pressurized refrigerant to a first condenser coil and a second flow of the pressurized refrigerant to a modulating valve. The modulating valve may be configured to direct a first portion of the second flow to a second condenser coil and a second portion of the second flow to a reheat heat exchanger. The first condenser coil and the second condenser coil may be configured to cool the first flow of the refrigerant and the second portion of the second flow of the refrigerant, respectively. The reheat heat exchanger may be configured to place the second portion of the second flow of the refrigerant in a heat exchange relationship with an air flow to heat the air flow and to cool the second portion of the second flow of the refrigerant. The HVAC system may also include an evaporator coil configured to place the cooled first flow of the refrigerant, the cooled first portion of the second flow of the refrigerant, and/or the cooled second portion of the first flow of the refrigerant in a heat exchange relationship with the air flow to cool the air flow and produce a supply air flow. Operation of the modulating valve may enable acute control of the properties of the supply air flow to condition a space to which the supply air flow is delivered. For example, the evaporator coil may be operated to cool the air flow and remove a target amount of moisture contained in the produced supply air flow, thereby dehumidifying the supply air flow to achieve a desirable humidity, and the modulating valve may be operated to apportion the second flow of the refrigerant between the second condenser coil and the reheat coil to condition the air flow to achieve a target temperature of the supply air flow. Thus, the humidity and/or the temperature of the supply air flow and/or of the space may be acutely controlled. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A heating, ventilation, and/or air conditioning (HVAC) system, comprising:
    a modulating valve of a vapor compression circuit, wherein the modulating valve is configured to receive a refrigerant flow from a compressor of the vapor compression circuit and configured to direct the refrigerant flow to a condenser coil of the vapor compression circuit and to a reheat coil of the vapor compression circuit in a parallel flow arrangement; and
    control circuitry communicatively coupled to the modulating valve, wherein the control circuitry is configured to operate the modulating valve to apportion the refrigerant flow between the condenser coil and the reheat coil based on first data indicative of a first operating parameter of a supply air flow directed through the HVAC system and based on second data indicative of a second operating parameter of a return air flow received by the HVAC system from a conditioned space to modify the first operating parameter to approach the second operating parameter.

2. The HVAC system of claim 1, wherein the control circuitry is configured to receive the first data from a first sensor configured to detect a first temperature of the supply air flow discharged by the HVAC system, and the control circuitry is configured to receive the second data from a second sensor configured to detect a second temperature of the return air flow received by the HVAC system from the conditioned space.

3. The HVAC system of claim 2, wherein the control circuitry is configured to operate the modulating valve to apportion the refrigerant flow between the condenser coil and the reheat coil to modify the first temperature to approach the second temperature in response to a user input indicative of a request for dehumidification.

4. The HVAC system of claim 1, wherein the control circuitry is configured to operate the modulating valve to apportion the refrigerant flow between the condenser coil and the reheat coil to modify a humidity of the supply air flow to approach a setpoint humidity.

5. The HVAC system of claim 4, wherein the control circuitry is configured to receive the setpoint humidity via a user input.

6. The HVAC system of claim 1, comprising a fan configured to direct an outdoor air flow across the condenser coil, wherein the control circuitry is configured to operate the fan to maintain a pressure of the refrigerant flow discharged from the condenser coil above a threshold pressure level.

7. The HVAC system of claim 1, comprising a fan configured to direct an outdoor air flow across the condenser coil, wherein the control circuitry is configured to adjust a speed of the fan to adjust a flow rate of the refrigerant flow directed through the reheat coil.

8. The HVAC system of claim 1, comprising the vapor compression circuit, wherein the vapor compression circuit comprises the modulating valve, the condenser coil, the compressor, the reheat coil, and an additional condenser coil, the vapor compression circuit is configured to direct the refrigerant flow from the compressor to the modulating valve, and the vapor compression circuit is configured to direct an additional refrigerant flow from the compressor to the additional condenser coil.

9. The HVAC system of claim 8, wherein the vapor compression circuit comprises an expansion valve, and the vapor compression circuit is configured to direct a combined flow of the refrigerant flow and the additional refrigerant flow to the expansion valve.

10. A tangible, non-transitory, computer-readable medium comprising instructions that, when executed by processing circuitry, are configured to cause the processing circuitry to:
    receive a demand to dehumidify a conditioned space serviced by a heating, ventilation, and/or air conditioning (HVAC) system;
    receive first data indicative of a first detected operating parameter of a return air flow received by the HVAC system from the conditioned space;
    receive second data indicative of a second detected operating parameter of a supply air flow directed through the HVAC system; and
    operate a modulating valve of the HVAC system to direct a first portion of a refrigerant flow from a compressor of the HVAC system to a condenser coil of the HVAC system and to direct a second portion of the refrigerant flow from the compressor to a reheat coil of the HVAC system, in parallel with the first portion of the refrigerant flow, in response to receiving the demand and to modify the second detected operating parameter to approach the first detected operating parameter.

11. The tangible, non-transitory, computer-readable medium of claim 10, wherein the first detected operating parameter is a first temperature of the return air flow, and the second detected operating parameter is a second temperature of the supply air flow.

12. The tangible, non-transitory, computer-readable medium of claim 11, wherein the instructions, when executed by the processing circuitry, are configured to cause the processing circuitry to:
    receive a setpoint humidity; and
    operate the modulating valve to modify a humidity of the supply air flow to approach the setpoint humidity.

13. The tangible, non-transitory, computer-readable medium of claim 10, wherein the instructions, when executed by the processing circuitry, are configured to cause the processing circuitry to:
    operate a fan to direct an outdoor air flow across the condenser coil; and
    adjust a speed of the fan to adjust a flow rate of the second portion of the refrigerant flow directed through the reheat coil.

14. The tangible, non-transitory, computer-readable medium of claim 10, wherein the instructions, when executed by the processing circuitry, are configured to cause the processing circuitry to:
- operate a fan to direct an outdoor air flow across the condenser coil;
- receive third data indicative of a flow rate of the refrigerant flow directed to an expansion valve of the HVAC system; and
- adjust a speed of the fan to maintain the flow rate of the refrigerant flow directed to the expansion valve above a first threshold flow rate and below a second threshold flow rate.

15. The tangible, non-transitory, computer-readable medium of claim 14, wherein the instructions, when executed by the processing circuitry, are configured to cause the processing circuitry to receive the third data from at least one sensor, and wherein the third data comprises a first pressure of the first portion of the refrigerant flow discharged by the condenser coil, a second pressure of the second portion of the refrigerant flow discharged by the reheat coil, a first temperature of the first portion of the refrigerant flow discharged by the condenser coil, a second temperature of the second portion of the refrigerant flow discharged by the reheat coil, a first flow rate of the first portion of the refrigerant flow, a second flow rate of the second portion of the refrigerant flow, or any combination thereof.

16. A heating, ventilation, and/or air conditioning (HVAC) system, comprising:
- a modulating valve of a vapor compression circuit, wherein the modulating valve is configured to receive a refrigerant flow from a compressor of the vapor compression circuit and configured to direct a first portion of the refrigerant flow to a condenser coil of the vapor compression circuit and to direct a second portion of the refrigerant flow a reheat coil of the vapor compression circuit in parallel with the first portion of the refrigerant flow; and
- control circuitry configured to:
  - receive, via a first sensor, first data indicative of a first current operating parameter of a space conditioned by the HVAC system;
  - receive, via a second sensor, second data indicative of a second current operating parameter of a supply air flow directed through the HVAC system; and
  - operate the modulating valve to apportion the first portion of the refrigerant flow and the second portion of the refrigerant flow to modify the second current operating parameter to approach the first current operating parameter.

17. The HVAC system of claim 16, wherein the control circuitry is configured to operate the modulating valve to apportion the first portion of the refrigerant flow and the second portion of the refrigerant flow to modify the second current operating parameter to approach the first current operating parameter in response to a demand to dehumidify the space conditioned by the HVAC system received by the control circuitry.

18. The HVAC system of claim 16, wherein the first current operating parameter is a first current temperature of the space conditioned by the HVAC system detected by the first sensor, and the second current operating parameter is a second current temperature of the supply air flow discharged by the HVAC system detected by the second sensor.

19. The HVAC system of claim 16, wherein the first current operating parameter is a first current temperature, detected by the first sensor, of a return air flow received by the HVAC system from the space conditioned by the HVAC system, and the second current operating parameter is a second current temperature, detected by the second sensor, of the supply air flow discharged by the HVAC system.

20. The HVAC system of claim 16, wherein the control circuitry is configured to adjust a speed of a variable speed fan configured to direct ambient air across the condenser coil, and the control circuitry is configured to adjust the speed of the variable speed fan to adjust a flow rate of the refrigerant flow to an expansion valve of the vapor compression circuit.

* * * * *